United States Patent
Saliba

(10) Patent No.: US 6,587,305 B2
(45) Date of Patent: Jul. 1, 2003

(54) TAPE HEAD WITH TRANSDUCER SUPPORTS HAVING RAISED, WEAR-RESISTANT SURFACES AT EDGES OF SOFTER CORE

(75) Inventor: George A. Saliba, Northborough, MA (US)

(73) Assignee: Quantum Corporation, Milpitas, CA (US)

(*) Notice: Subject to any disclaimer, the term of this patent is extended or adjusted under 35 U.S.C. 154(b) by 208 days.

(21) Appl. No.: 09/821,845

(22) Filed: Mar. 28, 2001

(65) Prior Publication Data

US 2002/0141112 A1 Oct. 3, 2002

(51) Int. Cl.⁷ .................................................. G11B 5/10
(52) U.S. Cl. ......................................................... 360/129
(58) Field of Search .......................... 360/129, 130.21, 360/130.31, 130.33

(56) References Cited

U.S. PATENT DOCUMENTS

| | | | |
|---|---|---|---|
| 3,663,765 A | 5/1972 | Schneider | 179/100.2 C |
| 3,665,436 A | 5/1972 | Murray et al. | 340/174.1 F |
| 4,251,841 A | 2/1981 | Jacobs | 360/122 |
| 4,418,473 A | 12/1983 | Burkhart et al. | 29/603 |
| 4,430,440 A | 2/1984 | Wada et al. | 501/105 |
| 4,649,448 A | 3/1987 | Nakajima | 360/122 |
| 4,650,774 A | 3/1987 | Kawaguchi et al. | 501/87 |
| 4,709,284 A | 11/1987 | Endo et al. | |
| 4,814,915 A | 3/1989 | Wada et al. | |
| 4,835,640 A | 5/1989 | Endo et al. | |
| 4,868,697 A | 9/1989 | McClure | 360/122 |
| 5,136,775 A | 8/1992 | Onoe et al. | 29/603 |
| 5,426,551 A | 6/1995 | Saliba | 360/122 |
| 5,469,313 A * | 11/1995 | Isozaki et al. | 360/129 |
| 5,475,553 A | 12/1995 | Saliba | 360/122 |
| 5,574,606 A * | 11/1996 | Kimura | 360/130.21 |
| 5,602,704 A | 2/1997 | Gooch et al. | 360/125 |
| 5,663,856 A | 9/1997 | Packard | 360/122 |
| 5,737,158 A * | 4/1998 | Tanaka et al. | 360/130.21 |
| 5,883,770 A | 3/1999 | Biskeborn et al. | 360/130.21 |
| 6,040,964 A | 3/2000 | Saliba | 360/121 |

FOREIGN PATENT DOCUMENTS

| | | |
|---|---|---|
| EP | 0 469 618 A2 | 5/1992 |
| EP | 0 590 701 A2 | 6/1994 |

\* cited by examiner

*Primary Examiner*—Allen Cao
(74) *Attorney, Agent, or Firm*—Morrison & Foerster LLP

(57) ABSTRACT

A magnetic head is provided for use with magnetic recording media of varying stiffness. The head includes a first and a second elongated support spaced apart on a facing surface with support surfaces extending along a longitudinal axis. A core support is positioned between the two elongated supports and is wider than the support surfaces to distribute tape contact pressures. The core support includes a transducer core with an elongated contact surface positioned to extend transverse to the longitudinal axis of the support surfaces. An edge member is positioned adjacent the contact surface of the transducer core to control wear and direct airflow. The edge member includes a wear surface of a material with greater wear resistance than the transducer core. A second edge member is provided on the opposite side of the contact surface of the transducer core to accommodate multi-direction tape travel.

23 Claims, 5 Drawing Sheets

TAPE HEAD WITH TRANSDUCER SUPPORTS HAVING RAISED, WEAR-RESISTANT SURFACES AT EDGES OF SOFTER CORE

BACKGROUND OF THE INVENTION

1. Field of the Invention

The present invention relates, in general, to magnetic tape head assemblies for use in conjunction with magnetic contact recording media, and more particularly to a tape head with a transducer support assembly with protective edges, i.e., at the leading and trailing edges, adjacent the core to create an increased height or radius adjacent the core and read/write gap to enhance air removal and to provide wear protection for the softer core materials during high speed operations with a number of recording media or tape having varying stiffness.

2. Relevant Background

Magnetic head assemblies typically contain one or more raised strips or supports that have surfaces over which the magnetic recording media, e.g., tape, passes. Embedded in each support surface is a transducer which may be a recording transducer (i.e. recording or writing head) for writing information (i.e., bits of data) onto the media or a reproducing transducer (i.e., reproducing or reading head) for reading information from the media. An embedded recording transducer produces a magnetic field in the vicinity of a small gap in the core of the recording transducer that causes information to be stored on the magnetic media as it streams across the support surface. In contrast, a reproducing transducer detects a magnetic field near the surface of the magnetic media in the vicinity of a small gap as the media streams over the support surface.

There is typically some microscopic separation between the gap of the transducer core and the recording media. During operation, this separation must be tightly monitored and controlled to avoid or minimize "spacing loss." The separation reduces the magnetic field coupling between the recording transducer and the media during writing and between the media and the reproducing transducer during reading. The magnetic field coupling decreases exponentially both with respect to increases in the separation between the media and the support and with respect to increases in the recording density. The amount of media area required to store a bit of data is a factor in determining recording density and as less media area is required to store a bit of data, the recording density increases. Thus, while a higher, more easily obtainable amount of head-to-media separation may be acceptable at low recording densities, the growing demand for higher recording densities has led to the need for tighter control over the head-to-media separation that can be tolerated to obtain useful levels of magnetic coupling.

To control spacing loss, a tension is applied to the tape as the tape passes at a wrap angle around a support surface and an adjacent transducer core surface each having a height and a width. Due to this tension, the tape exerts a pressure against the support surface, and if the support surface and core surface have uniform widths and heights, the pressure is substantially uniform along a longitudinal axis of the support. The pressure is essentially proportional to the tension and the wrap angle and inversely proportional to the support width.

In some tape head assembly designs, the pressure is intentionally increased to control spacing loss. For example, the pressure can be increased by increasing the tension in the tape, by modifying the wrap angle of the tape on the support surface, and/or by modifying the width of the support surface. However, increased pressure is accompanied by negative consequences including reduced tape life, increased possibility of tape damage and data loss, and support and core surface wear leading to a shortened head life. Moreover, increased pressure can result in uneven wear along the support surface, which can be particularly troublesome between regions of the support and the transducer core. As can be appreciated, increased and uneven wear rates become more serious problems as operational speeds for magnetic head assemblies are increased.

Operational problems with head wear and uneven wear have recently grown with the use of magnetic media having varying stiffness. For example, a magnetic head assembly may be used to read and write to a magnetic tape with a given stiffness that causes the magnetic tape to have a corresponding natural radius and contours. The support surfaces and core typically will wear to fit better this radius and natural contours of the tape. When the magnetic head assembly is then used with a magnetic tape having a different stiffness, e.g., a higher stiffness tape, a larger and sometimes unacceptable separation distance may initially exist until again the magnetic media is worn or broken in to match the new tape stiffness. Hence, there is a need for a magnetic head assembly that address the need for wear control that is also useful for magnetic media of varying stiffness.

Several magnetic head assembly designs have been developed in attempt to address these wear problems. In many tape head assembly designs, the pressure at the core is increased to enhance magnetic coupling by providing an elongated support assembly in which the width of the core and adjacent surfaces is less than the width of the adjacent elongated support surfaces. This smaller width makes the pressure applied non-uniform along the longitudinal axis of the support with higher pressure being applied at the core area and providing a better contact area. Unfortunately, this head design often results in higher wear rates at the core area that may lead to uneven wear within the support assembly. In some cases, higher core wear rates and pressures have been addressed with the use of wear resistant materials for the core center and/or in the adjacent supporting surfaces that are either parallel to the travel path of the media over the core or on all sides of the core.

In a different design approach, the support area near the core is made wider than the adjacent elongated support surfaces to obtain a softer or lower pressure mating of core and magnetic media. Wider core area designs are described in detail in U.S. Pat. Nos. 5,426,551 and 5,475,533 to Saliba, which are both incorporated herein by reference. The wider support surface near the core results in less pressure being applied at the core which is beneficial in controlling uneven wear. The wear rate is further controlled by providing wear surfaces of glass or other nonmagnetic material adjacent the magnetic ferrite core positioned parallel to the travel path of magnetic media. The wear rate is self-regulated to be relatively uniform along the longitudinal axis of the support assembly because the pressure is less than on the elongated support surfaces that are fabricated of a more wear resistant material. While addressing some industry problems, these wider core area devices tend to function well initially but then also develop problems of uneven wear on support surfaces and of core wear as the entire support assembly experiences wear. Additionally, the height of the core and adjacent wear surfaces typically are selected for a particular media and media thickness and experience wear that makes the device better suited for continued use with that media rather than for several media with varying stiffnesses.

Additionally, air flowing under the magnetic media during higher speed operations can cause spacing losses, and airflow needs to be addressed during magnetic head assembly design. During operation, air is moved within the magnetic head assembly as the magnetic media rapidly advances across the surfaces of the assembly facing and supporting the magnetic media, such as the support surface and the core. Spacing losses can develop when the flowing air passes between the core and read/write gap and the magnetic media. In the narrower core area devices, air tends to be channeled over the core because it first strikes the wider adjoining support surfaces and then is forced into the narrower core area. The wider core area devices provide better airflow control with the air first striking the wider core area and being channeled away towards the adjacent, narrower support areas where reading and/or writing is not occurring. However, for both types of head assemblies, the use of numerous magnetic media with differing stiffness often results in airflow problems that result in spacing losses. Also, over the lifetime of the head assemblies, wear (and particularly, uneven wear) often results in changing airflow paths that can lead to airflow problems even in devices that initially functioned effectively.

Hence, there remains a need for a magnetic head assembly that better controls airflow over a magnetic core and provides enhanced wear control in surfaces contacting the magnetic media, which may have varying stiffness.

SUMMARY OF THE INVENTION

The present invention addresses the above discussed and additional problems by providing a wider core area design for a transducer support assembly that controls uneven wear problems while also providing improved airflow control to limit spacing losses (e.g., to minimize "floating" separation). The inventor recognizes that the use of a wider core area relative to narrower adjacent, elongated support surfaces often results in the contact pressure applied by the media, e.g., magnetic recording tape, being concentrated at the edges of the wider core area, i.e., core support. Hence, as the tape passes over the transducer support assembly, the edges (note, both edges act as leading and trailing edges depending on the direction of travel of the media) are worn down at a faster rate, which can cause airflow problems and spacing losses.

To address this problem that is generally unique to wider core area designs in tape head assemblies, the core support is initially manufactured to include wear surfaces of a harder, more wear-resistant material at the two leading/trailing edges to extend the useable life of tape head assemblies. In a preferred embodiment, the wear-resistant edge members are raised (or, alternatively, the edge members may initially be coplanar with softer adjacent wear surfaces and allowed to become raised due to wear occurring in an initial break-in wear period) to provide a larger height than the core. After a break in or initial wear period the edge members and core contact surfaces become generally arcuate in cross-section with the initially larger radius of the edge members controlling wear on core. In operation, the arcuate surfaces typically form a single continuous curved surface with a single radius that contacts the recording media. Having an edge member that always has a larger or equal radius to the adjacent core surface is especially beneficial for high speed operations as it better directs airflow (e.g., strips away air being moved with the tape from the core area) and protects the transducer core from wear.

More particularly, a magnetic head is provided for writing to and reading from magnetic recording media, such as tapes of varying stiffness. The head includes first and second elongated supports spaced apart on a facing surface and having support surfaces extending along a longitudinal axis. During operation, the magnetic recording media travels transversely across the support surfaces applying a contact pressure. A core support is positioned between the two elongated supports. The core support has a width as measured perpendicularly to the longitudinal axis of the support surfaces that is greater than the widths of the support surfaces thus creating a nonuniform pressure distribution along the longitudinal axis (e.g., when contact surfaces are coplanar or the same radius, greater pressure is applied on the narrower support surfaces).

The core support includes a transducer core with an elongated contact surface positioned to extend transverse to the longitudinal axis of the support surfaces. An edge member is positioned adjacent the contact surface of the transducer core to control wear and direct airflow. In this regard, the edge member includes a wear surface for contacting the media that is fabricated of a material, such as aluminum titanium carbide or zirconium, that is harder and has a greater wear resistance than the transducer core. In a preferred embodiment, a second edge member is provided on the opposite side of the contact surface of the transducer core to accommodate multiple tape travel directions. After initial fabrication, the wear surfaces of the edge members are substantially coplanar and raised relative to the contact surface of the transducer core and the support surfaces. Additionally, the contact surface itself may be raised relative to the support surfaces with these two surfaces have similar hardness and wear resistance characteristics (e.g., both surfaces may be magnetic ferrite or the like). In this manner, the magnetic head provides self-regulating wear regions that adjust to distribute the contact pressure and wear such that the wear surfaces of the edge members are generally raised relative to the contact surface of the transducer core and the support surfaces.

After break in and during the operational life of the head, the wear surfaces of the edge members are arcuate with a radius that is larger than the adjacent wear surfaces. In this fashion, the edge members control the contact with the magnetic media and the rate of wear in the adjacent protected core area. The contact surface of the core that was initially lower than the wear surfaces of the edge members eventually becomes arcuate and has a radius that is substantially equal to or slightly less than the wear surfaces of the edge members. The contact surface of the core and the wear surfaces of the edge members generally form a continuous contact surface that is raised (or at a larger radius) than the adjacent elongated supports to provide good coupling and contact with the recording media.

DETAILED DESCRIPTION OF THE PREFERRED EMBODIMENTS

The present invention provides the features of enhanced airflow control and media contact surface wear control by providing a unique transducer support assembly. The assembly utilizes a pair of edge members (leading or trailing depending on travel direction of the magnetic media) in a wider core support design. The wear surfaces of the edge members are fabricated from a wear-resistant material, such as aluminum titanium carbide (ALTC) or zirconium, that is harder than the adjacent nonmagnetic support member (e.g., glass, ceramic material, and the like) and transducer core (e.g., ferrite such as single crystal ferrite or metal in gap ferrite (MIG)). The wear surfaces of the edge members may be configured to be initially raised relative to the nonmagnetic support member, transducer core, and elongated supports or facing members or due to the higher relative hardness, the edge members may become relatively raised due to uneven initial wear rates during operation. The raised leading and trailing edges provides improved air control as it blocks or redirects flowing air from passing over the transducer core and gap and ensures that the radius (e.g., height) of the transducer core remains greater than the critical or natural radius of the magnetic medium.

The invention is described in the following discussion as being particularly useful as part of a linear tape head assembly for use in a magnetic tape head assembly with transducer elements that are ferrite cores. However, those skilled in the art will understand that the transducer element or core may be a core inductive head, a magneto resistive read element, a thin film gap head, and other types of transducer elements in which it is useful to protect the core and gap from wear and airflow and to control the radius or height of the transducer element to manage spacing losses. Additionally, the magnetic media discussed for use with the invention is magnetic recording tape of varying stiffness, but the invention may be useful with other media such as contact hard disks, floppy disks, and the like.

Figure 2:
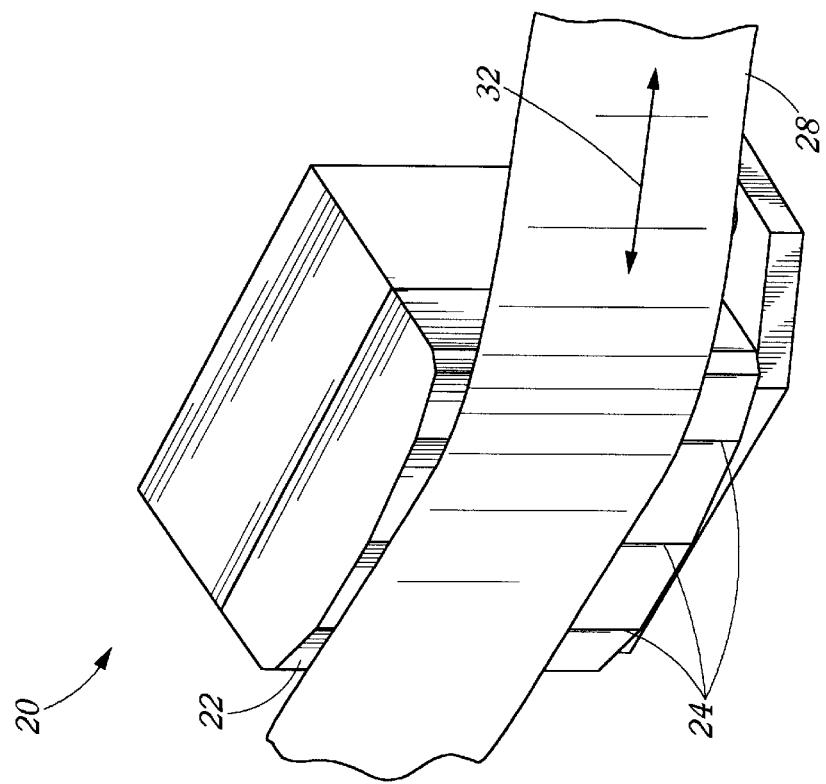
FIG. 2 is an illustration of the linear tape head assembly of FIG. 1 during operation showing the positioning and movement of a magnetic media, i.e., a magnetic recording tape, relative to tape facing surfaces and to three elongated transducer support assemblies.
Figure 1:
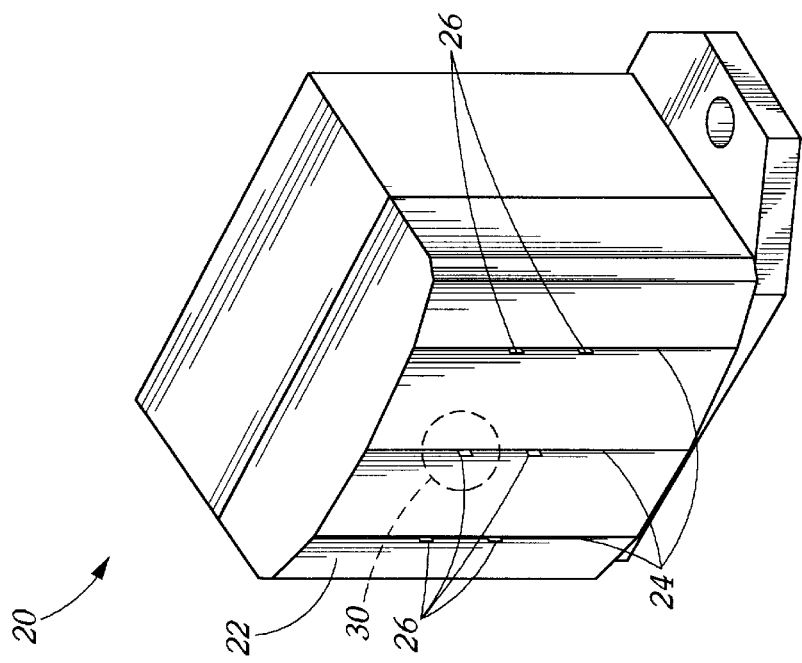
FIG. 1 is a perspective view of a linear tape head assembly in which the principles of the present invention are particularly suited.

Referring now to FIGS. 1 and 2, a linear tape head assembly 20 according to the invention is shown for use in writing to and reading from a magnetic recording tape 28. The head assembly 20 includes tape facing surfaces 22 and three transducer support assemblies 24 for contacting and supporting the tape 28 as it moves in either direction shown by arrow 32. In this manner, the transducer support assemblies 24 provide wear surfaces for the assembly 20. The tape 28 is at a selectable tension that causes the tape 28 to apply a contact pressure on the transducer support assemblies 24 during reading and writing operations of the linear tape head assembly 20. The transducer support assemblies 24 as shown include a pair of transducer cores 26 (as best seen in FIG. 3) for providing read and write functions of the assembly 20.

The linear tape head assembly 20 is provided by way of example, and it should be understood that other types of tape head assemblies may be configured to include the transducer support assembly 24 of the present invention. For example, a helical tape drive assembly (not shown) may be designed with a rotating magnetic tape head that includes the transducer support assembly 24 and core(s) 26. In this embodiment, the rotating magnetic tape head records information in helical form on a magnetic media (such as a tape 28) and reproduces information from the helical form stored on the magnetic media. The transducer support assembly 24 of the present invention will now be discussed in conjunction with the linear tape head assembly 20 using a ferrite core. However, the core support and transducer support assembly of the present invention may be used with other types of transducer elements (not shown).

Figure 3:
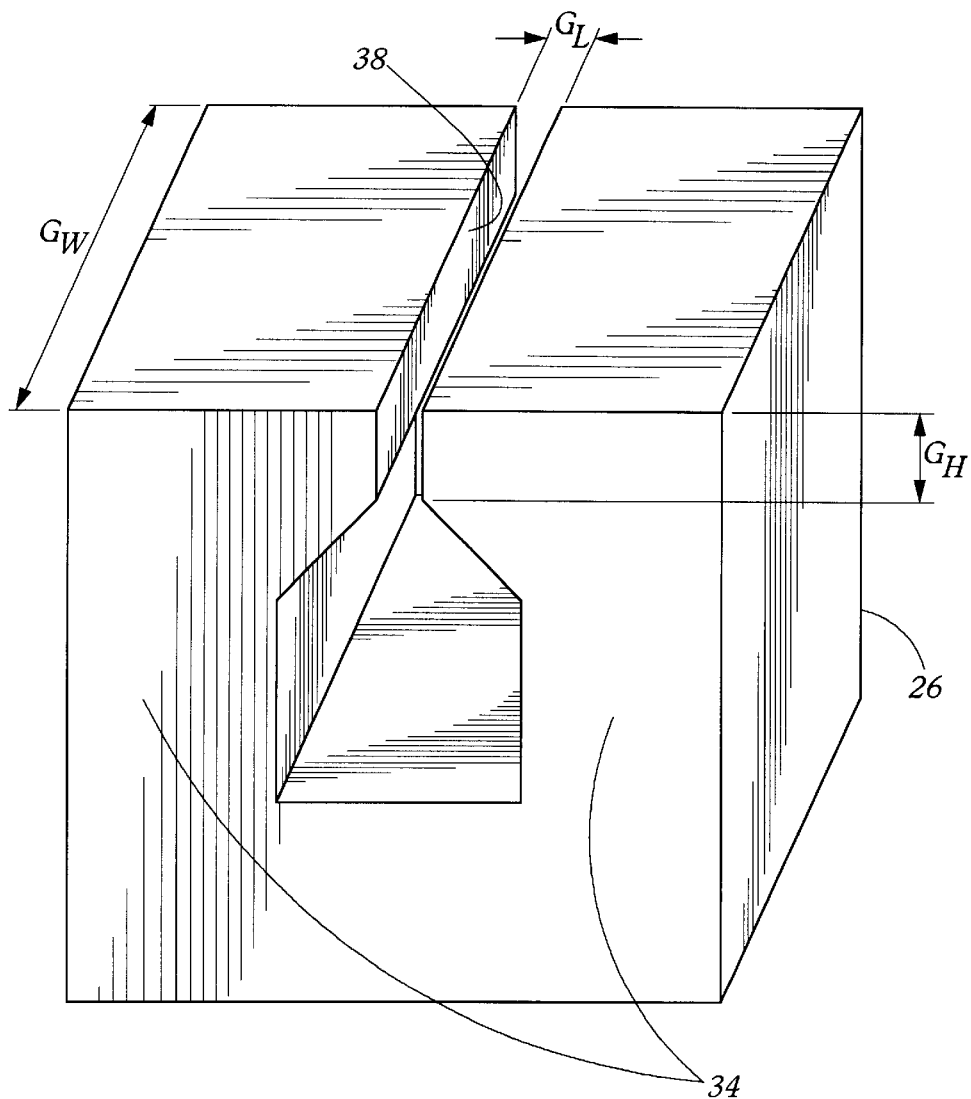
FIG. 3 is an enlarged perspective view of one embodiment of a transducer core for use with the tape head assembly of FIG. 1 showing the read/write gap.

Referring to FIG. 3, a typical core 26 (e.g., a magnetic ferrite core such as a single crystal ferrite) is shown. The core 26 has a gap 38. The core 26 typically is one element in a transducer (not shown) that may be a recording transducer or a reproducing transducer. Each recording transducer provides a magnetic field in the vicinity of the gap 38 in the surface of the core 26. Each reproducing transducer detects a magnetic field near the surface of the magnetic tape 28 in the vicinity of the gap 38. The gap 38 has a gap length, $G_L$, a gap width, $G_W$, and a gap height, $G_H$ (which is often referred to as the pole tip height and is defined by the poles 34). The gap width, $G_W$, is generally equal to the width of a track on the tape 28, i.e., the tape track width, which is often about two milliinches. The gap length, $G_L$, may be varied to provide desired read and write functionality, and in one embodiment, is about ten microinches.

Figure 4:
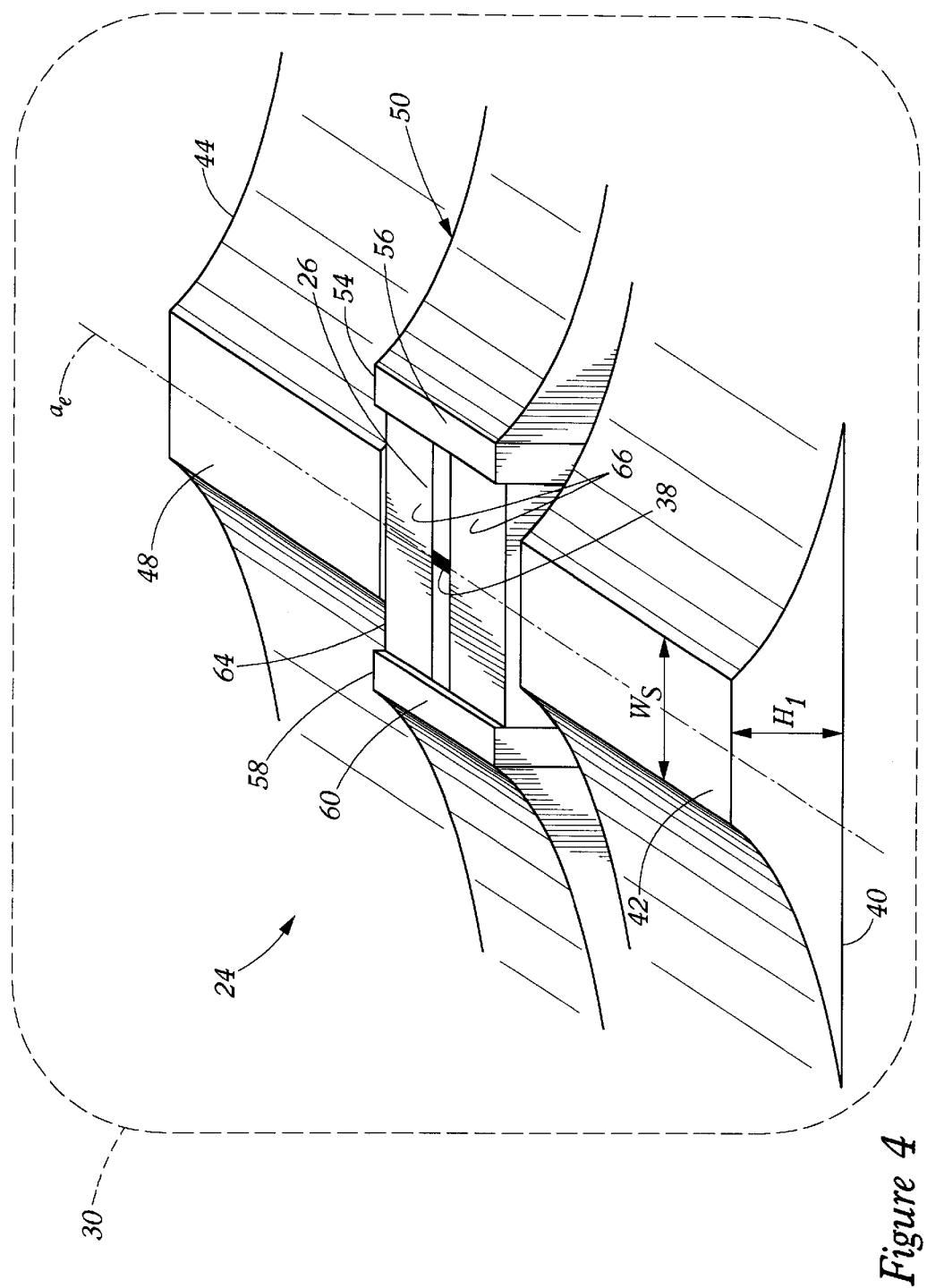
FIG. 4 is an enlarged partial view one of the transducer support assemblies of FIG. 1 illustrating the use of two elongated supports to sandwich and support a core support having raised, wear-resistant edge members according to a significant feature of the invention.

According to an important feature of the invention, the tape head assembly 20 includes a transducer support assembly 24 that provides enhanced airflow control and wear resistance. Referring to FIG. 4, an enlarged view of a representative portion 30 of one embodiment of the transducer support assembly 24 of FIG. 1 is illustrated as it would appear after initial fabrication (i.e., before a break in period or extended use). As shown, the transducer support assembly 24 includes the core 26 that is supported within a core support 50, which is itself sandwiched between elongated support 40 and elongated support 44. The elongated supports 40, 44 include planar support or facing surfaces 42, 48, respectively, for contacting the tape 28 and providing wear surfaces for the transducer support assembly 24. In a preferred embodiment, the elongated supports 40, 44 are fabricated from the same material as the core 26, such as a ferrite. However, other types of magnetic material such as nickel zinc, magnesium zinc, and other well-known materials may be used for the support surfaces 42, 48 to provide wear resistance. The support surfaces 42, 48 are raised relative to the tape facing surfaces 22 of the head assembly 20 to a first height, $H_1$, and have a support width, $W_S$, for providing a contacting surface with the tape 28 during operations.

The core support 50 of the transducer support assembly 24 provides the significant structural features that provide the necessary magnetic coupling between the transducer core 26 and the tape 28. As discussed previously, the core support 50 is designed to strip air away from the rapidly moving tape 28 to control floating or lifting of the tape 28 away from the core 26 and minimize spacing losses during read/write operations. Additionally, the core support 50 is configured to be useful with different magnetic media, such as tapes, that have differing stiffnesses, which cause the tapes to be wrapped on the head assembly at different radii and/or contours. Significantly, the structural features of the core support 50 are selected such that the most wear resistant features are always as high or higher relative to the facing surfaces 22 than the softer core and wear surfaces. In this manner, the core support 50 can be thought of as creating a larger, wear resistant radius that is suited for nearly any tape stiffness and tension, e.g., from the lowest stiffness tape to the highest stiffness tape utilized as a magnetic media.

Figure 5:
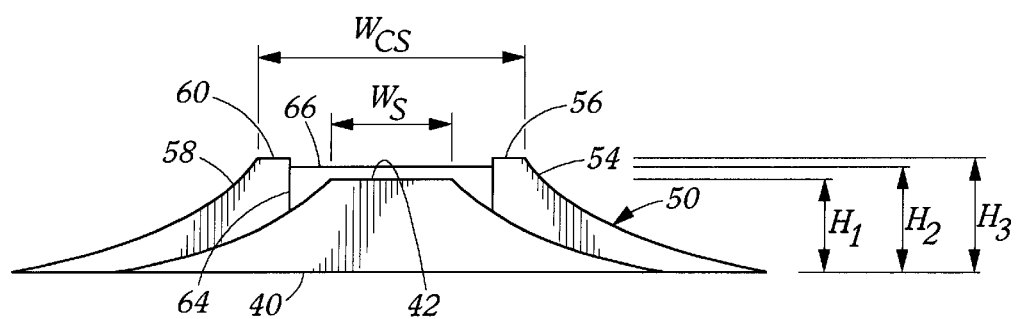
FIG. 5 is an end elevation view of the transducer support assembly of FIG. 4 showing a preferred embodiment in which the height of the wear-resistant edge members is greater than the height of the wear surface of the nonmagnetic support member adjacent the transducer core and the height of the support surfaces of the elongated supports.

Turning to FIGS. 4 and 5, the core support 50 illustrated includes a pair of wear-resistant edge members 54 and 58 with wear surfaces 56 and 60, respectively, that contact the tape 28. The edge members 54, 58 are positioned at each end of the core 26 such that the tape 28 contacts the edge members 54, 58 in either direction of movement (as shown by arrow 32 in FIG. 2). In one embodiment, the core 26 is secured within the core support 50 with a nonmagnetic support member 64 that has wear surfaces 66. The nonmagnetic support member 64 may be fabricated from numerous nonmagnetic materials including many ceramics and glasses. In one embodiment, the nonmagnetic support member 64 comprises calcium titinate, nonmagnetic ferrite, or barium titinate.

Importantly, the edge members 54, 58 are fabricated from a material that is more wear resistant than the adjacent core 26, the wear surface 66 of the nonmagnetic support 64, and the support surfaces 42, 48 of the elongated supports 40, 44. This results in the wear-resistant edge members 54, 58 wearing at a lower rate than the other wear and support surfaces 26, 66, 42, and 48 when a relatively uniform pressure or wearing force is applied by the tape 28. When the contact pressure is more concentrated at the raised edge members 54, 58 the wear rate along the transducer support assembly 24 is more uniform. A number of wear resistant materials may be utilized with the key consideration being that the selected material provide a wear rate that is lower than the other surface materials at a similar contact pressure or wearing force. In one embodiment, the edge members 54, 58 (and more particularly, the wear surfaces 56, 60) are fabricated from aluminum titanium carbide (ALTC) and in another embodiment, zirconium is employed to provide the desired lower wear rate.

In the illustrated "as-fabricated" embodiment of the core support 50, the wear surfaces 56 and 60 of the edge members 54, 58 are at a height, $H_3$, relative to the facing surface 22 of the head assembly 20. This height is preferably equal to or greater than the height, $H_2$, of the wear surfaces 66 of the nonmagnetic support member 64 and the core 26. This may be achieved by initially fabricating the wear surfaces 56, 60 at a height, $H_3$, greater than the height, $H_2$, of the wear surface 66 of the nonmagnetic member 64. Further, in the illustrated embodiment, the support surfaces 42, 48 of the elongated supports 40, 44 are at a height, $H_1$, relative to the facing surface 22, which is less than or equal to the height, $H_2$, of the core 26 and the nonmagnetic support member 64 wear surface 66 (see, for example, FIG. 5 which illustrates this height differential). Of course, many heights may be utilized in initial fabrication, such as having $H_1$ being about equal to $H_2$. The important design factor is that the edge members 54, 58 be harder and/or more wear resistant than the nonmagnetic support element 64 and core 26 and in some embodiments, harder and/or more wear resistant than the support surfaces 42, 48. This hardness differential will typically result in the illustrated heights after tape 28 is run over the transducer support assembly 24 for a period of time.

In another preferred embodiment, the support surfaces 42, 48, the wear surfaces 66 of the nonmagnetic support member 64, the core 26, and the wear surfaces 54, 60 of the wear-resistant edge members 54, 58 are initially fabricated to be substantially coplanar and at the same initial height (i.e., $H_1=H_2=H_3$). In this initial configuration, all of the wearing and support surfaces of the transducer support assembly 24 provide a relatively flat, coplanar surface that mates with the inner radius and contours of the tape 28 in the head assembly 20. As the tape 28 is run across the wear and support surfaces that have differing wear rates (i.e., the wear surfaces 56, 60 of the edge members 54, 58 being lower or more wear resistant) the contacting surfaces will experience a pressure that is nonuniform along the length of the wear and support surfaces (i.e., along the longitudinal axis, $a_1$). As discussed previously, a higher contact pressure is placed on the narrower support surfaces (i.e., $w_S$ is less than the width, $w_{CS}$, of the core support 50). Because the wear surfaces 56, 60 of the edge members 54, 58 are fabricated from a more wear resistant material such as ALTC, the support surfaces 42, 48 wear more rapidly and the height, $H_3$, of the wear surfaces 56, 60 of the edge members 54, 58 quickly becomes larger than the height, $H_1$, of the support surfaces 42, 48. After this break in period, the height differential remains for the life of the head assembly 20 resulting in controlled airflow and wear protection.

Often, the core 26 and wear surface 66 of the nonmagnetic support member 64 are fabricated of materials similar in hardness as the support surfaces 42 and 48 but because these surfaces are protected by the edge members 54, 58 the wear rates experienced are less than those experienced at the support surfaces 42, 48. Hence, after the initial break in period of wear, the height, $H_2$, is less than the height, $H_3$, of the wear surfaces 56, 60 of the edge members 54, 58 but greater than the height, $H_1$, of the support surfaces 42, 48 of the elongated supports. The contact pressure becomes relatively uniform throughout the wear and support surfaces of the transducer support assembly 26 with some concentration of pressure remaining on the harder, wear-resistant edge members 54, 58.

Referring back to FIGS. 2 and 4, during read/write operations with the tape head assembly 20, the tape 28 will run over each of the wear surfaces 56, 60, 66, over the core 26 and gap 38, and the support surfaces 42, 48 of the elongated supports 40, 44. The axis, $a_1$, of the support surfaces is substantially perpendicular to the tape travel direction 32 while the core support 50 is wider with its axis being substantially parallel to the tape travel direction 32. The technique of providing a wider tape wear surface in the area around the transducer element and a more narrow wear surface in adjacent regions of a transducer support assembly is described in detail in U.S. Pat. No. 5,426,551, entitled "Magnetic Contact Head Having A Composite Wear Surface" and U.S. Pat. No. 5,475,553 entitled "Tape Head With Self-Regulating Wear Regions," both issued to George Saliba and both being incorporated fully herein by reference. These two patents describe in detail useful dimensions and geometries for the wear surfaces 66, 26 and support surfaces 42, 48 of the transducer support assembly 24 that are readily applicable by those skilled in the art to the present invention.

Note, these patents do not suggest the use of a harder, more wear-resistant leading edge member, such as members 54, 58, and teach that wear would be expected to be substantially uniform on the surfaces of the wider transducer core support. In contrast, the present invention recognizes that even with a relatively uniform contact pressure along the longitudinal axis, $a_1$, of the transducer support assembly 24, localized higher pressure points typically will arise in head assemblies 20 and need to be addressed.

As illustrated in FIG. 4, the wear surfaces 56, 60 of the edge members 54, 58 and support surfaces 42, 48 of elongated supports 40, 44 are illustrated as rectangular but numerous initial shapes may be utilized to assist in initial manufacturing and to provide desired airflow conditions within the head assembly 20. In operation, it will be understood that wear by the tape 28 alters the shapes of the contacting surfaces of the transducer support assembly 24. For example, initially the surfaces are in an unworn condition, such as that shown in FIG. 4, and as the tape 28 begins to repeatedly advance across the wear surfaces the pressure exerted by the tape 28 is less on the wider core support 50 surfaces than on the narrower support surfaces 42, 48 of the elongated supports 40, 44. This lower contact pressure may appear undesirable for providing good read/write contact, but the nonuniform contact pressure results in initial nonuniform wear such that after a short break in period the pressure becomes more uniform.

Due to the initial nonuniform wear on the wear surfaces the wider core support 50 becomes raised relative to the support surfaces 42, 48 of the elongated supports 40, 44. Specifically, in an embodiment that utilizes materials of similar wear resistance for the core 26, the nonmagnetic support member 64, and the elongated supports 40, 44, the core 26 and wear surface 66 of the nonmagnetic support member 64 become raised relative to the support surfaces 42, 48 due to the nonuniform pressure (i.e., $H_2$ becomes greater than $H_1$). Further, the use of more wear-resistant materials for the wear surfaces 56, 60 of the edge members 54, 58 results in these surfaces becoming raised relative to both the nonmagnetic support member 64 and the elongated supports 40, 44 (i.e., $H_3$ becomes greater than $H_2$ and $H_1$).

Figure 6:
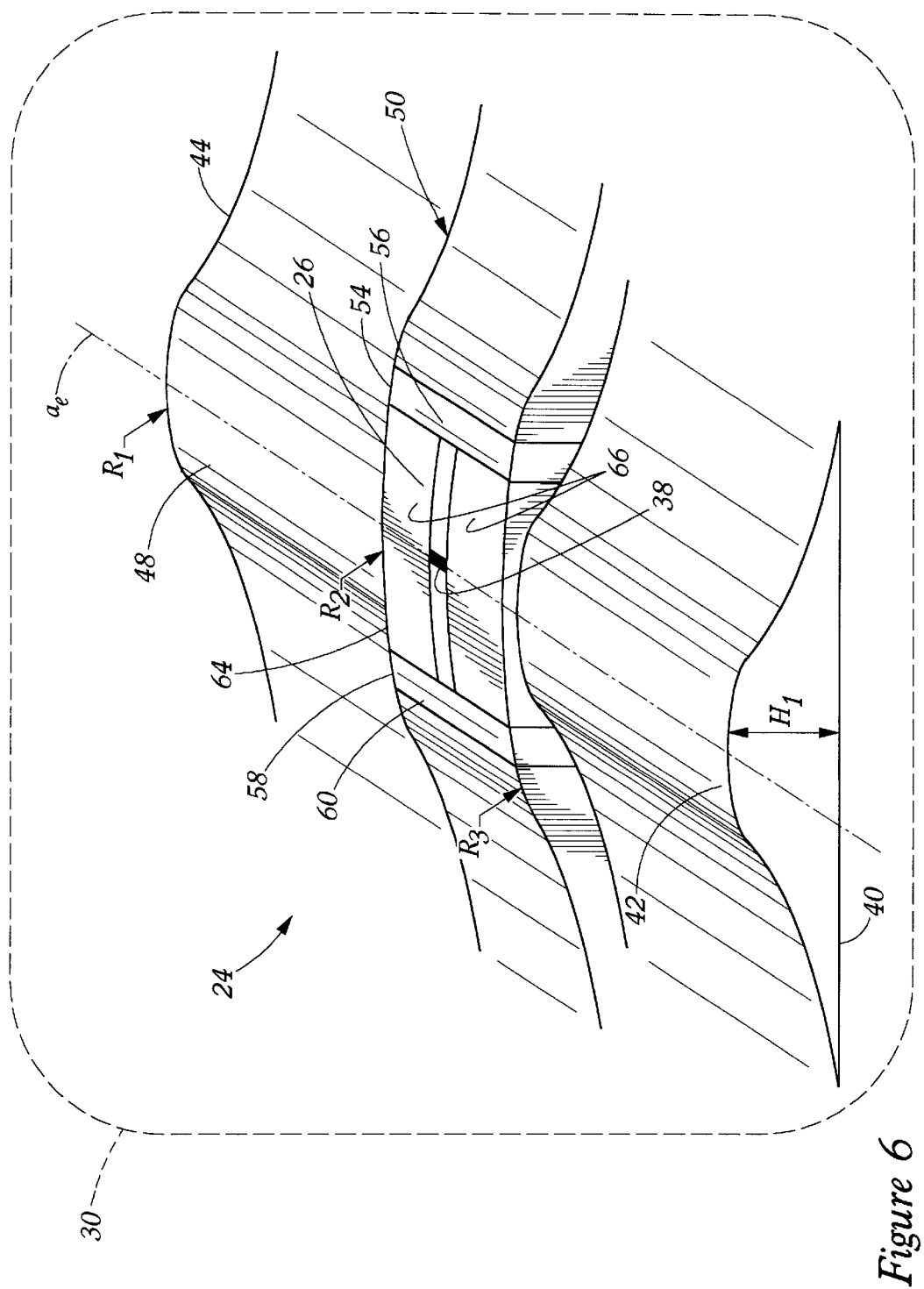
FIG. 6 is a view of the transducer support assembly after an initial break in period illustrating the relative radii of the contact surfaces that is substantially retained for the operational life of the assembly.
Figure 7:
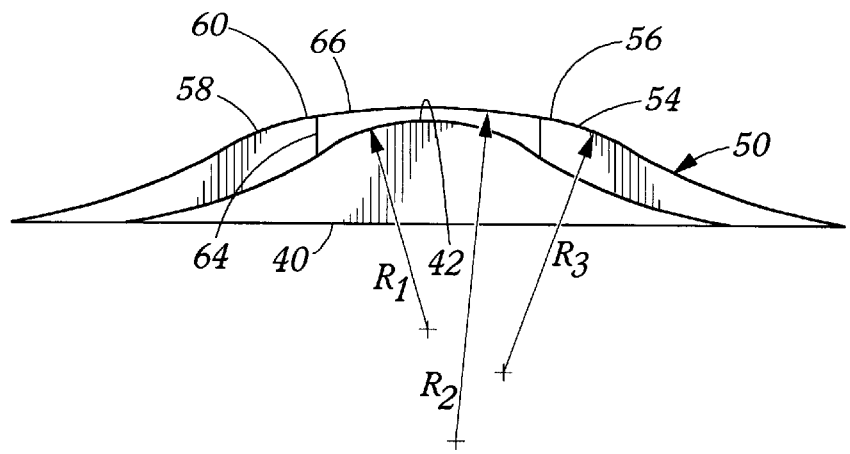
FIG. 7 is a side view of the assembly of FIG. 6 illustrating that edge member surface areas, the nonmagnetic support member surface areas, and the core form a substantially continuous curved surface with a single radius suited to the critical radius of the recording medium.

The wear results in a changing profile of the elements of the transducer support assembly 24, as is best seen in FIGS. 6 and 7. As shown in FIG. 2, the tape 28 is wrapped around the tape head assembly 20 to form a tape radius or arc at each of the contacting transducer support assemblies 24. The wear pattern of the tape 28 on the surfaces of the transducer support assembly 24 typically results in the surfaces obtaining rounded edges or curved planar surfaces. As illustrated in FIGS. 6 and 7, the profile of the transducer support assembly 24 shown in FIG. 5 formed by three arcuate wear or contact surfaces having slightly different radii (or, as will be explained below, the radius of the wear surfaces 56, 60 of the edge members 54, 58 may be substantially equal to the radius of the core 26).

As shown, the support surfaces 42, 48 have an arcuate cross-sectional shape when viewed along the axis, $a_1$, that has a radius, $R_1$. The two wear surfaces 56 and 60 of the edge members 54 and 58 are also curved or arcuate surfaces that are generally on the same arc having radius, $R_3$. The surfaces 66 of the nonmagnetic support member 64 and the contact surface of the core 26 generally form a single curved or arcuate surface that has a radius, $R_2$. Due to the selection of a harder and/or more wear resistant material for the wear surfaces 56, 60 and their location in the assembly 24, these surfaces 56, 60 control the rate of wear in the assembly 24. Pressure is initially concentrated on these surfaces 56, 60 and they wear more rapidly at first until wear begins to occur on the adjacent surfaces 26, 66, and 42, 48. After an initial break in period or service period, the assembly takes on an appearance or configuration as shown in FIGS. 6 and 7.

As shown, the radius, $R_3$, of the wear surfaces 56, 60 is greater than or equal to the radius, $R_2$, of the surface formed by surfaces 66 and the core 26. In turn, the radius, $R_2$, is greater than or equal to the radius, $R_3$, of the support surfaces 42, 48. In a preferred embodiment (as illustrated), the wear surfaces 56, 60, the core 26, and the nonmagnetic surfaces 66 form a single, substantially continuous, arcuate surface for contacting the tape 28 and having a radius greater than or equal to the radius, $R_2$, of the core 26. During operation, the edge members 54, 58 control the wear rate and the radius, $R_3$, is self-regulating to remain greater than or equal to the radius, $R_2$, of the core. For example, the radius, $R_3$, of the wear surfaces 56, 60 may be in the range of about 0.3 to 0.7 milliinches while the radius, $R_2$ of the wear surface 66 of the nonmagnetic support member 64 and core 26 may be in the range of about 0.3 to 0.5 milliinches and the radius, $R_1$, of the support surfaces 42, 48 may be less than about 0.3 to about 0.2 milliinches.

The break in period can also be accelerated or eliminated during manufacturing through the use of an abrasive lapping tape to remove or reduce any sharper contact edges. Significantly, the use of the harder, more wear-resistant material for the wear surfaces 56, 60 of the edge members 54, 58 allows these two surfaces 56, 60 to remain at substantially the same radius, $R_3$, that is raised above or at the same radius as the adjacent surfaces and to contact the tape 28, e.g., at a radius that is larger than the other contact radii and that better matches or suits the contour of the tape 28 as it is placed in tension within the head assembly 20.

Once the break in period is completed, the wear rate becomes more uniform along the longitudinal axis, $a_1$, of the transducer support assembly 24 and the core support 50 surfaces remain raised above or at a larger radius than the elongated supports 40, 44. Relatively uniform wear is achieved according to the invention by utilizing more wear-resistant materials, such as ALTC, at the locations of higher contact pressure (i.e., at the edge members 54, 58). The process of wear on the tape contact surfaces of the transducer support assembly 24 is essentially self-regulating for the operational life of the head assembly 20. When the raised core support 50 surfaces become relatively too high or low, the contact pressure along the longitudinal axis, $a_1$, becomes more nonuniform until the radii, $R_1$, $R_2$, and $R_3$, again adjust to acceptable differential levels (e.g., $R_{\geq R2} > R_1$) to better distribute the contact pressure applied by the tape 28.

During operation of the head assembly 20, the movement of the tape 28 as shown by arrow 32 across the tape facing surfaces 22 causes air to be moved or pushed toward the transducer support assembly 24. Without airflow control, this moving air can lift the tape 28 away from the core 26 causing spacing losses. According to the invention, however, the combined use of a raised, wear-resistant edge member 54, 58 and a wider core support 50 effectively strips air from under the tape 28 at the important point of contact between the gap 38 of the core 26. In practice, the air being moved by the tape 28 initially contacts the wider core support 50 at the leading one of the edge members 54, 58 which forces the air to the sides toward the elongated supports 40, 44.

Additionally, the wear surfaces 56, 60 of the edge members 54, 58 are raised which enables the edge members 54, 58 to better contact the tape 28 to strip or direct away air moving along with the tape 28. The redirected air instead flows over the lower support surfaces 42, 48 of the elongated support 40, 44 which provide a path of less resistance for the flowing air or down the channels on the facing surfaces 22 between the transducer support assemblies 24 on the head assembly 20. In this manner, the present invention significantly enhances airflow control to provide better magnetic coupling between the core 26 and the moving tape 28.

Figure 8:
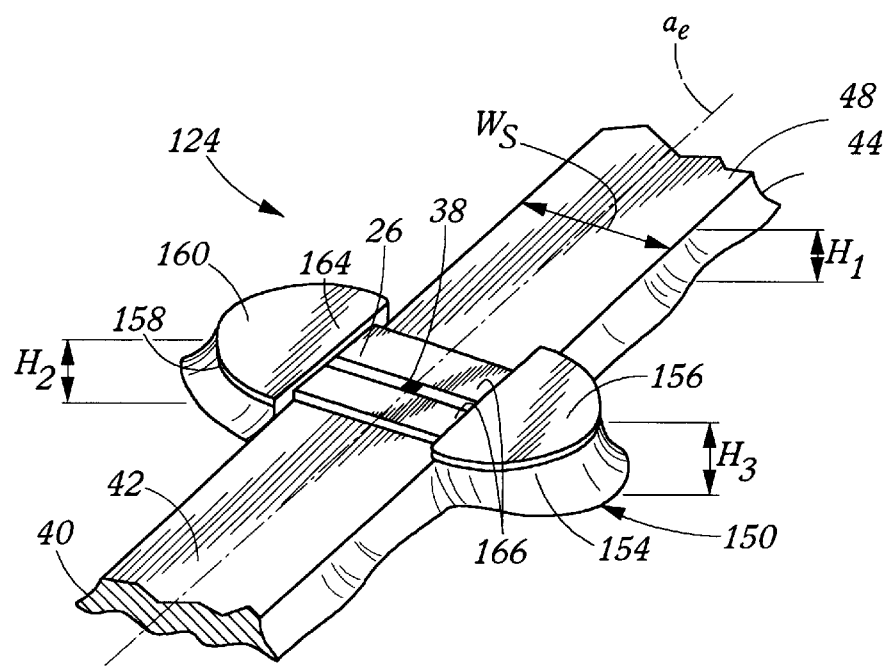
FIG. 8 is a view similar to FIG. 4 showing an alternate embodiment of a core support in which raised, wear-resistant edge members are curved to enhance aerodynamic features of the transducer support assembly.

To modify the aerodynamics or airflow control of the invention, additional configurations can be used that provide different edge configurations between the support and wear surfaces to provide airflow that at the leading contact profile that may be useful for obtaining better contact with the media and/or wear. For example, another preferred embodiment of a transducer support assembly 124 is shown in FIG. 8 that includes a wider core support 150. As in the transducer support assembly 24 (as initially manufactured), elongated supports 40, 44 are provided with support surfaces 42, 48 at a height, $H_1$, and a width, $W_S$, made of material such as ferrite or other material with a hardness and wear resistance similar to the materials of the included magnetic ferrite or other magnetic material core 26. The core support 150 supports and surrounds the core 26 and gap 38 and nonmagnetic support member 164 and is wider than the width, $W_S$, of the support surfaces 42, 48 to control the contact pressure applied by the tape 28 at the core 26 (as discussed above). A nonmagnetic support member 164 fabricated of ceramic material or other nonmagnetic material having wear surfaces 166 at a height, $H_2$, is provided to support and isolate the core 26 (with $H_2$ being greater or equal to $H_1$ initially or after a break in period).

To alter aerodynamics, the core support 150 includes sloped and curved edge members 154, 158 with wear resistant surfaces 156, 160 fabricated of a higher wear-resistant material such as ALTC, zirconium, and the like and at a height, $H_3$, greater than $H_1$ and $H_2$ initially or after break in wear. The shape of the surfaces 156, 160 is shown as substantially a semicircle but other shapes may be used in the invention as long as the surface extends beyond the surfaces 166 of the nonmagnetic support member 164.

The semicircle shape facilitates the wear of the surfaces 156, 160 to a raised, smoother mound without sharp edges. This configuration is useful for reducing turbulent airflow that may cause the tape 28 to lift in the vicinity of the core 26 and also better distributes contact pressures to reduce the magnitude of concentrated tape pressure. Of course, the more rectangular wear surfaces 56, 60 shown for transducer support assembly 24 will wear in response to concentrated pressures at the leading edges and corners resulting in the surfaces 56, 60 taking on a more curved or semi-circle shape (as discussed with reference to FIGS. 6 and 7).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the inventive transducer support assembly 24, 124 was illustrated for use in a linear tape head assembly 20 but the features of the transducer support assembly 24, 124 make it useful in numerous other tape head assembly configurations (not shown) such as a helical tape head assembly and in head assemblies in which the tape 28 runs transversely across the transducer support assembly at an angle other than 90 degrees. These different tape head assemblies may result in differing concentration of contact pressure that can readily be addressed with the use of the wear resistant edge members 54, 58 with or without modification to their shape and location relative to the core 26.

We claim:

1. A magnetic head for writing to and reading from magnetic recording media, comprising:

a first elongated support having a support surface extending along a longitudinal axis for contacting and supporting the media when the media is moved transverse to the longitudinal axis;

a second elongated support positioned apart from the first elongated support having a support surface extending along the longitudinal axis, wherein the support surfaces of the first and second elongated supports are at a support height and have a first and a second width as measured perpendicular to the longitudinal axis, and a core support positioned between the first and second elongated supports with a core support width measured perpendicular to the longitudinal axis that is greater than the first and second widths, wherein the core support includes a transducer core with a longitudinal axis transverse to the longitudinal axis of the elongated supports and an edge member positioned adjacent the transducer core along the longitudinal axis of the transducer core, the edge member including a wear surface for contacting the media comprising a material with greater wear resistance than the transducer core.

2. The magnetic head of claim 1, wherein the support surfaces of the first and second elongated supports are substantially coplanar and are at a first distance from a facing surface of the magnetic tape head, and wherein a contact surface of the transducer core is at a second distance from the facing surface, and the wear surface of the edge member is at a third distance from the facing surface.

3. The magnetic head of claim 2, wherein the third distance is greater than the second distance and the second distance is greater than the first distance.

4. The magnetic head of claim 1, wherein the support surfaces of the first and second elongated supports have an arcuate cross-section having a first radius, a contact surface of the transducer core has an arcuate cross-section having a second radius greater than the first radius, and the wear surface of the edge member has an arcuate cross-section having a third radius greater than or equal to the second radius.

5. The magnetic head of claim 4, wherein the third radius is about 0.3 to about 0.7 milliinches, the second radius is about 0.3 to about 0.5 milliinches, and the first radius is less than about 0.2 milliinches.

6. The magnetic head of claim 4, wherein the contact surface of the transducer core and the wear surface of the edge member form a substantially continuous contact surface with an arcuate cross-section having a radius greater than or equal to the second radius.

7. The magnetic head of claim 1, further including a second edge member including a wear surface for contacting the media positioned adjacent the transducer core along the longitudinal axis on a side of the transducer core opposite the first edge member, wherein the wear surface of the second edge member comprises a material of similar wear resistance as the first edge member wear surface material.

8. The magnetic head of claim 7, wherein the wear surfaces of the first and second edge members are substantially coplanar and comprise aluminum titanium carbide or zirconium.

9. The magnetic head of claim 8, wherein a contact surface of the transducer core comprises ferrite and the support surfaces of the first and second elongated supports comprises ferrite.

10. The magnetic head of claim 8, wherein the core support further includes a nonmagnetic support member with a wear surface comprising a nonmagnetic material interposed between a contact surface of the transducer core and the support surfaces of the first and second elongated supports.

11. The magnetic head of claim 10, wherein the wear surface of the nonmagnetic support member is substantially coplanar with the contact surface of the transducer core.

12. The magnetic head of claim 11, wherein the wear surface of the edge member extends parallel to the longitudinal axis of the first and second elongated supports beyond edges of a contact surface of the transducer core and the wear surface of the nonmagnetic support member.

13. A core support apparatus for use in a magnetic head for recording information on and reading information from a magnetic tape, comprising:
    a transducer element for magnetic coupling with the magnetic tape extending along a longitudinal axis and comprising a contact surface of a material with a first wear resistance;
    a nonmagnetic support member comprising a pair of wear surfaces adjacent the transducer element contact surface and extending substantially parallel to the longitudinal axis, the wear surfaces comprising a nonmagnetic material having a second wear resistance; and
    a pair of edge members positioned transverse the longitudinal axis and adjacent opposing ends of the wear surfaces of the nonmagnetic support member and the contact surface of the transducer element, wherein the edge members include wear surfaces for contacting the magnetic tape comprising a material having a third wear resistance that is greater than the first and the second wear resistances.

14. The core support apparatus of claim 13, wherein the contact surface and the wear surfaces of the nonmagnetic support member form a central arcuate wear surface with a center radius and the wear surfaces of the edge members form a pair of edge arcuate wear surfaces with an edge radius, further wherein the edge radius is greater than about the central radius.

15. The core support apparatus of claim 13, wherein the wear surfaces of the edge members comprise aluminum titanium carbide or zirconium.

16. The core support apparatus of claim 13, wherein the wear surfaces of the edge members extend transverse to the longitudinal axis of the transducer element beyond the contact surface.

17. The core support apparatus of claim 16, wherein the wear surfaces of the edge members extend transverse to the longitudinal axis of the transducer element along the end of the wear surfaces of the nonmagnetic support member.

18. A magnetic head for use with magnetic recording tapes of varying stiffness having enhanced self-regulating wear and airflow control to limit spacing losses, comprising;
    an elongated support having two generally elongated arcuate support surfaces against which a tape exerts a contact pressure comprising a magnetic material of a first wear resistance, wherein the support surfaces are generally aligned in a spaced apart relationship along their longitudinal axis and have a first radius, the longitudinal axis extending in a direction transverse to the directions of tape travel across the supporting surfaces;
    a nonmagnetic support member comprising a wear surface comprising a nonmagnetic material having a second wear resistance and being positioned in a space between the two support surfaces on the longitudinal axis the support surfaces;
    a transducer having an elongated, coupling surface having a third wear resistance and a substantially uniform width embedded in the nonmagnetic support member, wherein the coupling surface extends in a direction transverse to the longitudinal axis of the support surfaces and wherein the coupling surface and the wear surface of the nonmagnetic support form a composite wear surface that is generally arcuate with a second radius; and
    a pair of edge members positioned in abutting contact with opposing ends of the composite wear surface, wherein each of the edge members comprises an arcuate wear surface with a third radius comprising a material having a fourth wear resistance that is greater than the first, second, and third wear resistances.

19. The magnetic head of claim 18, wherein the third radius is greater than about the second radius and the second radius is greater than about the first radius.

20. The magnetic head of claim 19, wherein the third radius is in the range of about 0.3 to about 0.7 milliinches, the second radius is in the range of about 0.3 to about 0.5 milliinches, and the first radius is less than about 0.2 milliinches.

21. The magnetic head of claim 19, wherein the material of the wear surfaces of the edge members is aluminum titanium carbide or zirconium.

22. The magnetic head of claim 21, wherein the first and third wear resistances are substantially equivalent.

23. The magnetic head of claim 21, wherein the support surfaces have a first width as measured perpendicular to the longitudinal axis and the composite wear surface and the wear surfaces of the edge members have a second width as measured perpendicular to the longitudinal axis, the second width being greater than the first width.

* * * * *